United States Patent [19]
Pedrini

[11] Patent Number: 5,397,042
[45] Date of Patent: * Mar. 14, 1995

[54] SELF-CENTERING ROOF RACK

[76] Inventor: Fabio Pedrini, Via Zamboni 1 / Scala-A, Piano-1, Interno-3, CAP 40125 Bologna, Italy

[*] Notice: The portion of the term of this patent subsequent to Jul. 13, 2010 has been disclaimed.

[21] Appl. No.: 90,295

[22] Filed: Jul. 12, 1993

Related U.S. Application Data

[63] Continuation of Ser. No. 912,808, Jul. 13, 1992, Pat. No. 5,226,570.

[30] Foreign Application Priority Data

Jul. 16, 1991 [IT] Italy .............................. BO91A0256
Jun. 29, 1992 [IT] Italy .............................. BO92U0142

[51] Int. Cl.⁶ ............................................ B60R 9/058
[52] U.S. Cl. ............................... 224/329; 224/315
[58] Field of Search .................. 224/42.01, 42.03 R, 224/42.03 B, 279, 314, 316, 321–325, 917, 309, 310, 315, 329, 330, 331

[56] References Cited

U.S. PATENT DOCUMENTS

| | | |
|---|---|---|
| 2,222,636 | 11/1940 | Strauss . |
| 2,480,353 | 8/1949 | Bjork . |
| 2,720,350 | 10/1955 | Felton . |
| 2,788,929 | 4/1957 | Gallagher . |
| 2,833,453 | 5/1958 | Barreca . |
| 2,888,178 | 5/1959 | Olson . |
| 3,877,624 | 4/1975 | Carson . |
| 3,897,895 | 8/1975 | Read . |
| 3,924,764 | 12/1975 | Youngblood, Jr. . |
| 3,931,919 | 1/1976 | Gerber et al. . |
| 4,005,900 | 2/1977 | Rauthmann et al. . |
| 4,022,362 | 5/1977 | Revercomb . |
| 4,024,971 | 5/1977 | Rohrer . |
| 4,101,061 | 7/1978 | Sage et al. . |
| 4,120,436 | 10/1978 | Burch . |
| 4,139,110 | 2/1979 | Roberts . |
| 4,216,887 | 8/1980 | Kieffer . |
| 4,264,025 | 4/1981 | Ferguson et al. . |
| 4,326,654 | 4/1982 | Frey . |
| 4,354,625 | 10/1982 | Peoples .............................. 224/329 |
| 4,449,656 | 5/1984 | Wouden . |
| 4,461,414 | 7/1984 | Gieber . |
| 4,489,869 | 12/1984 | Wienhold et al. . |
| 4,688,706 | 8/1987 | Thulin . |
| 4,757,929 | 7/1988 | Nelson . |
| 4,793,535 | 12/1988 | Johnson . |
| 4,842,176 | 6/1989 | Stapleton . |
| 4,877,169 | 10/1989 | Grim . |
| 5,002,216 | 3/1991 | Gerber . |
| 5,038,988 | 8/1991 | Thulin et al. . |

FOREIGN PATENT DOCUMENTS

| | | |
|---|---|---|
| 220510 | 2/1959 | Australia .............................. 224/329 |
| 1201098 | 2/1986 | Canada . |
| 151907 | 8/1985 | European Pat. Off. ............ 224/309 |
| 253801 | 1/1988 | European Pat. Off. . |
| 433495 | 6/1991 | European Pat. Off. . |
| 2397956 | 2/1979 | France . |
| 2449000 | 9/1980 | France . |
| 2636897 | 3/1990 | France . |
| 2500535 | 7/1976 | Germany . |
| 3150130 | 6/1983 | Germany . |
| 3315555A1 | 10/1984 | Germany . |
| 3543514 | 6/1986 | Germany . |
| 3910952 | 10/1989 | Germany . |
| 1581591 | 12/1980 | United Kingdom . |
| 86/00584 | 1/1986 | WIPO . |
| 88/04620 | 6/1988 | WIPO . |
| WO89/04776 | 6/1989 | WIPO . |
| 91/10581 | 7/1991 | WIPO . |

Primary Examiner—Renee S. Luebke
Attorney, Agent, or Firm—Willian Brinks Hofer Gilson & Lione

[57] ABSTRACT

A self-centering roof rack system for transporting bicycles and other sporting goods on a motor vehicle. The rack includes a transverse bar mounted on the roof and supported by upright members at each end. The upright members are simultaneously moveable by rotation of a knob at one end of the rack by means of rotation of a threaded shaft which has right hand threads on one end and left hand threads on the other. The upright members are provided with either a pivoting or sliding mechanism that causes a floating hook adapted to grip a motor vehicle roof edge, the hook being caused to move upwardly and outwardly to firmly engage the roof as the uprights are moved toward each other.

20 Claims, 8 Drawing Sheets

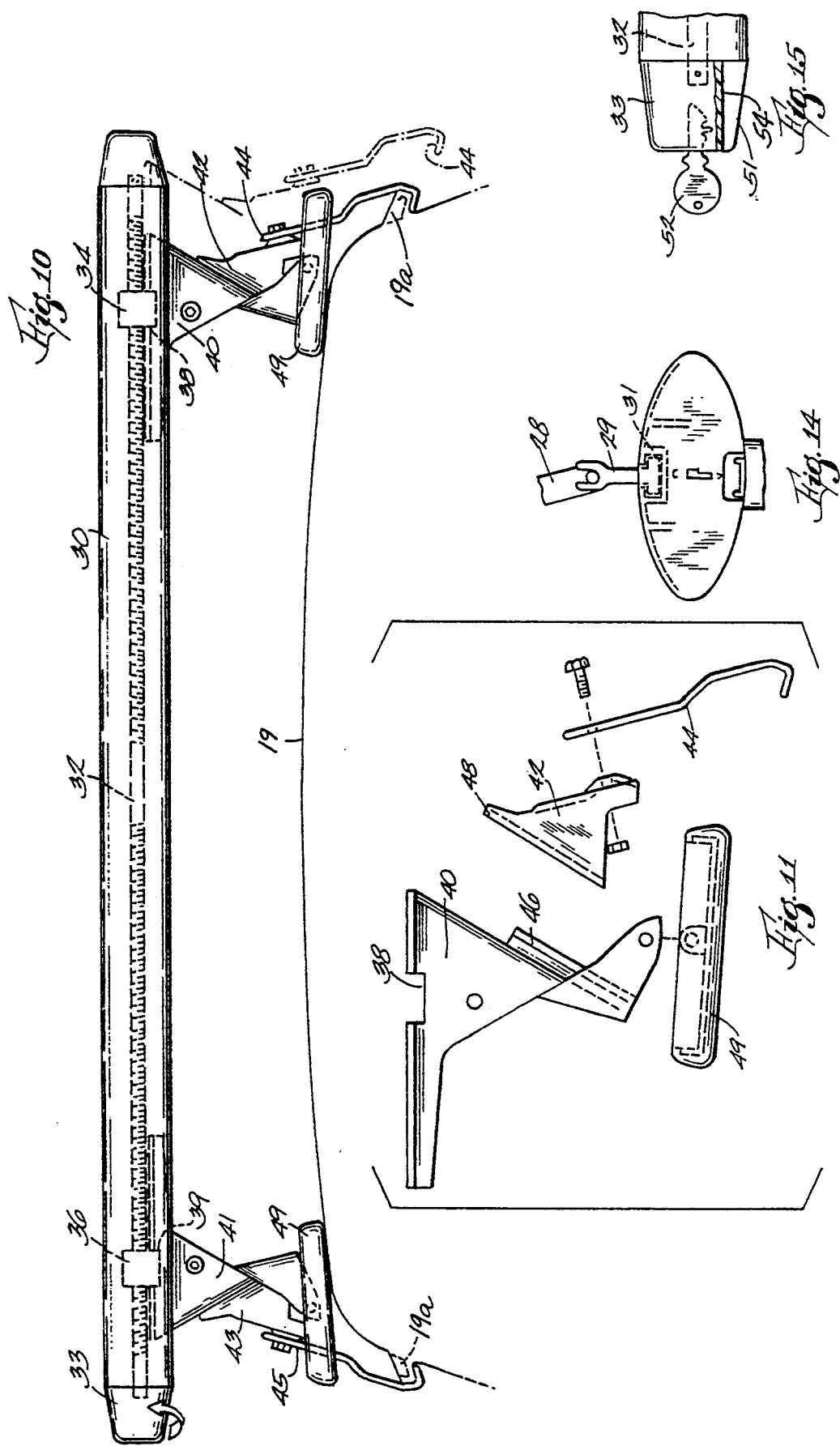

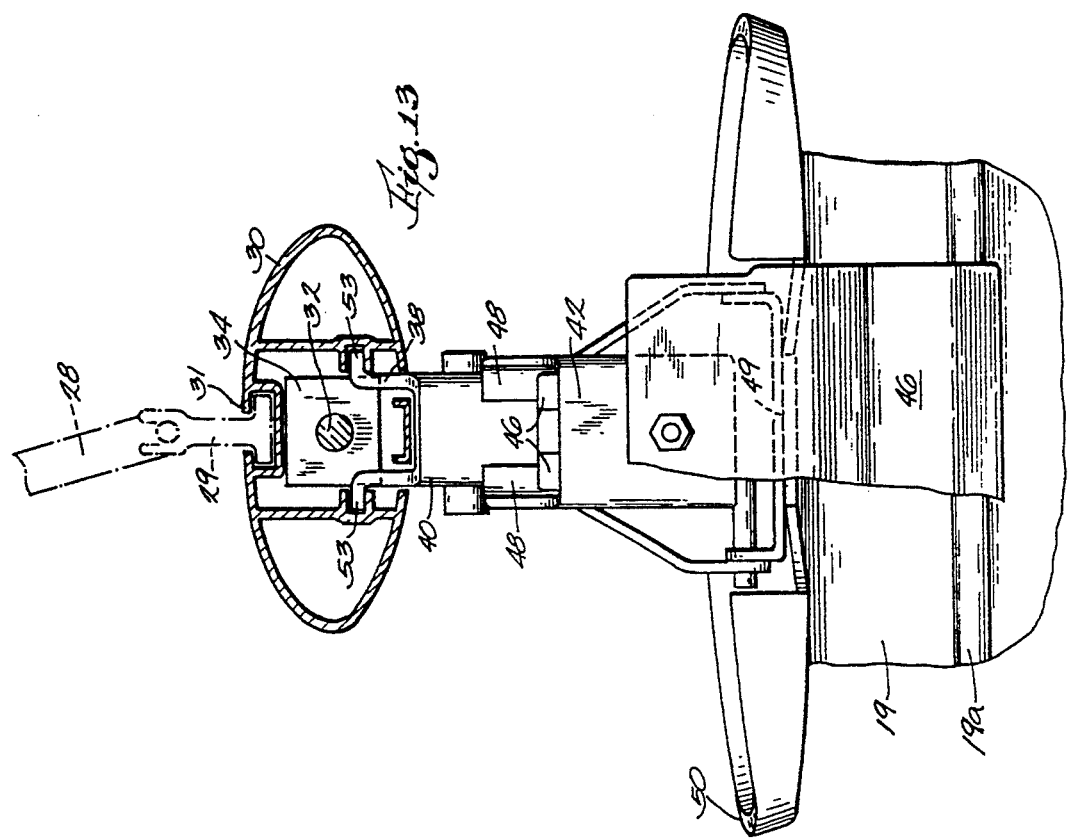
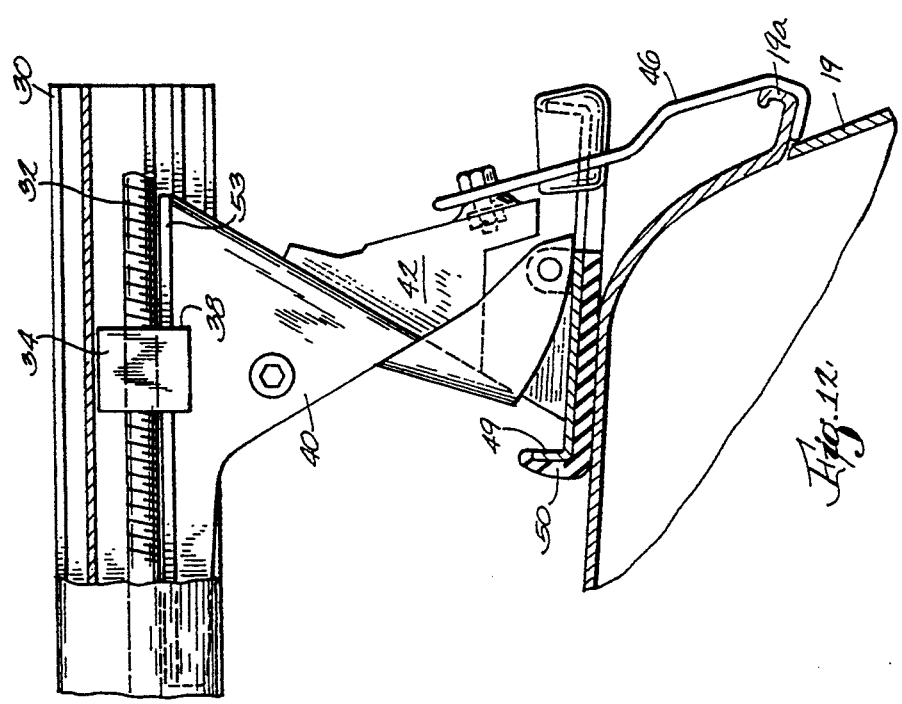

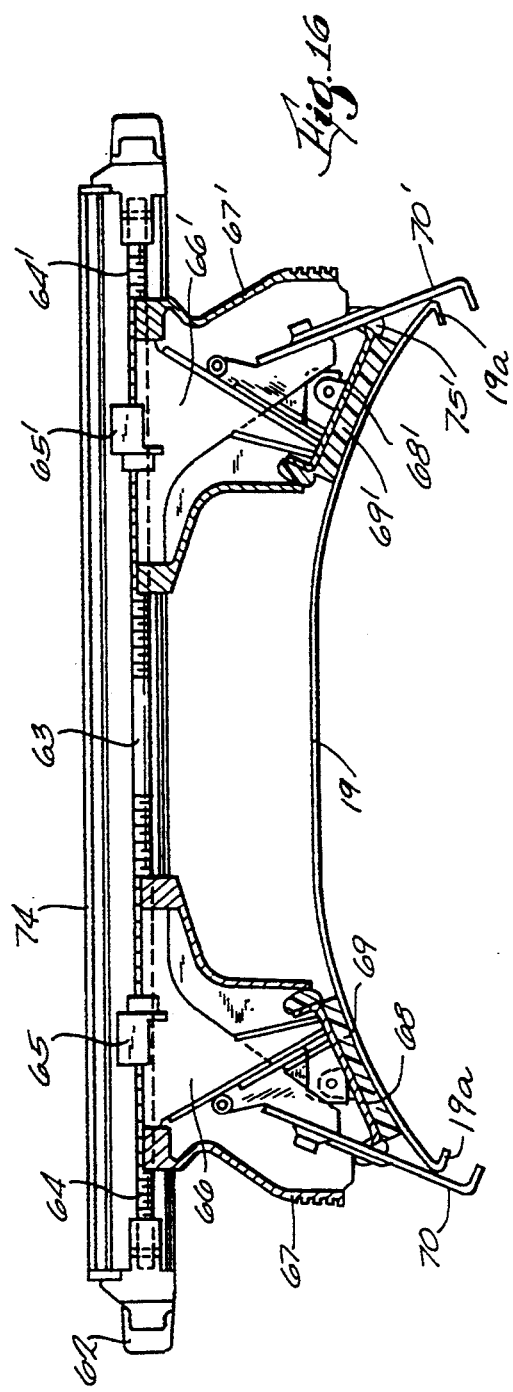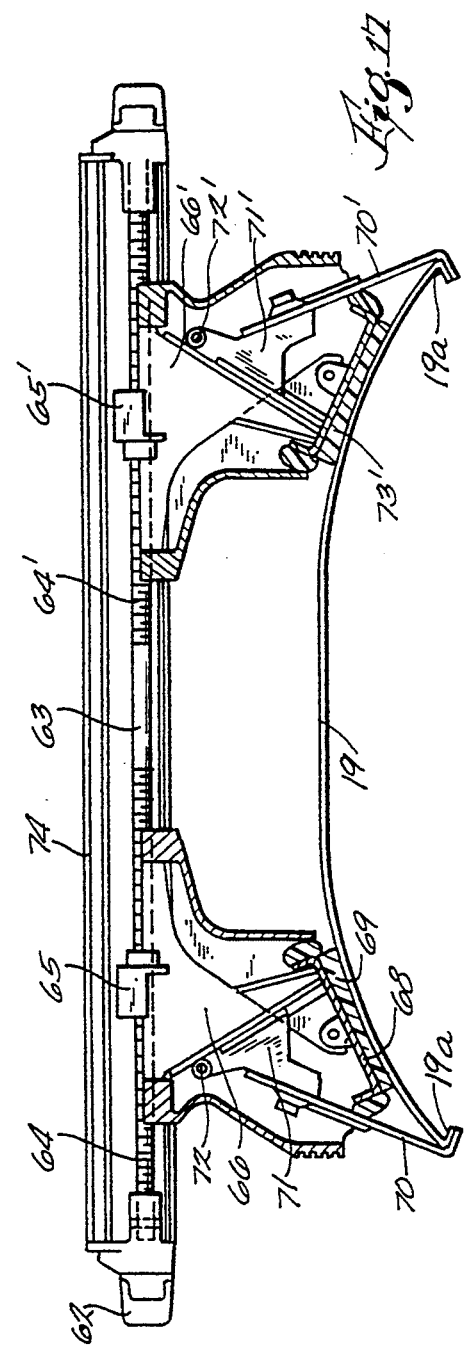

SELF-CENTERING ROOF RACK

This is a continuation of application Ser. No. 07/912,808, filed Jul. 13, 1992, now U.S. Pat. No. 5,226,570.

FILED OF THE INVENTION

The invention relates to self-centering roof rack systems for motor vehicles. More particularly, the invention relates to such systems that can be attached to or removed from the vehicle by a single handle mechanism. The handle operates on a threaded shaft, wherein one half of the shaft includes right-hand screw threads, and, the other half of the shaft includes left-hand screw threads. Each set of screw threads works simultaneously upon two nuts, that are each connected to roof rack uprights. Each upright has a floating hook which grips the motor vehicle roof edge. The double screw allows the fitting and fastening of the roof rack on the vehicle's roof symmetrically by turning a handle placed on one side of the system.

SUMMARY OF THE INVENTION

This invention relates to a roof rack system provided with self-centering means adapted to fit the roof of a motor vehicle. The system includes an alignment and rapid locking device operable by means of a mechanism operated by a single handle or knob. Commonly available roof racks consist of a transverse bar supported by two adjustable lateral uprights, on each side of the bar These uprights are fastened to the roof of the vehicle by means of bolted brackets which are attached to the edge of the roof. It is evident that the initial setting of the system requires skill from the user because the bar must be centered relative to the uprights and this may require several attempts.

Other systems consist of eccentric leverages, placed in relation to the lateral uprights in order to lock contemporaneously the upright to the roof and the transverse bar to the upright. This solution also implies several attempts in order to achieve a good centering of the transverse bar.

It is an object of the invention to solve the foregoing inconveniences and shortcomings because it allows, with only one easy and rapid operation, the setting and attachment of the roof rack to a motor vehicle roof without any previous adjustment.

In accordance with the invention, the transverse bar and the two upright holders are connected so that they form a single body. By means of mechanical devices, the locking force is transmitted to fasten the roof rack system to the vehicle. By turning a knob located at one end of the transverse bar, a horizontal translation force is applied on the uprights. Then a vertical fastening force is produced when clips or brackets associated with the uprights engage the vehicle roof, thereby pulling the uprights down onto the roof of the vehicle and locking the transverse bar in a stable position.

The mechanism is conceived so that the horizontal centering force is greater than the vertical force, and thereby contributes to the fastening of the rack without damaging or deforming the roof of the vehicle. An important aspect of the invention is to provide a construction in which the action required for securing the clips or bracket to the roof is combined with movement of the supporting uprights toward the center of the roof using a simple and reliable mechanism.

The balance of the forces operating on the movable parts, under the action of the handle, allows secure fastening of the system long before any damage or deformation of the car could occur because the fastening force commences early thereby alerting the operator to the fact that the attachment has been completed. The transverse bar can be manufactured by extrusion of metal of adequate cross-section. Various bicycle supporting parts of the system are individually removably and slidably attached to the rack.

DRAWINGS

In the following description and accompanying drawings other purposes and advantages will become apparent, as well as an exemplary embodiment of the invention.

FIG. 10 is a rear view of a roof top rack in accordance with another embodiment of the invention with parts shown by phantom lines;

FIG. 11 is a broken apart rear view showing the end support components of the rack shown in FIG. 10;

FIG. 12 is an enlarged view of one end of the rack shown in FIG. 10, illustrating engagement of a roof gutter;

FIG. 13 is a side view of the rack shown in FIG. 12 wherein a load to be transported is supported thereon;

FIG. 14 is an end view of the transverse bar of the rack of this invention illustrating attachment of a load for transporting;

FIG. 15 is a fragmentary end view showing the rotating knob of a rack of this invention;

FIG. 16 is a rear view of a modified embodiment of the invention with parts in cross-section;

FIG. 17 is a rear view of the rack shown in FIG. 16 engaged on the roof of a vehicle;

DETAILED DESCRIPTION

Figure 4:
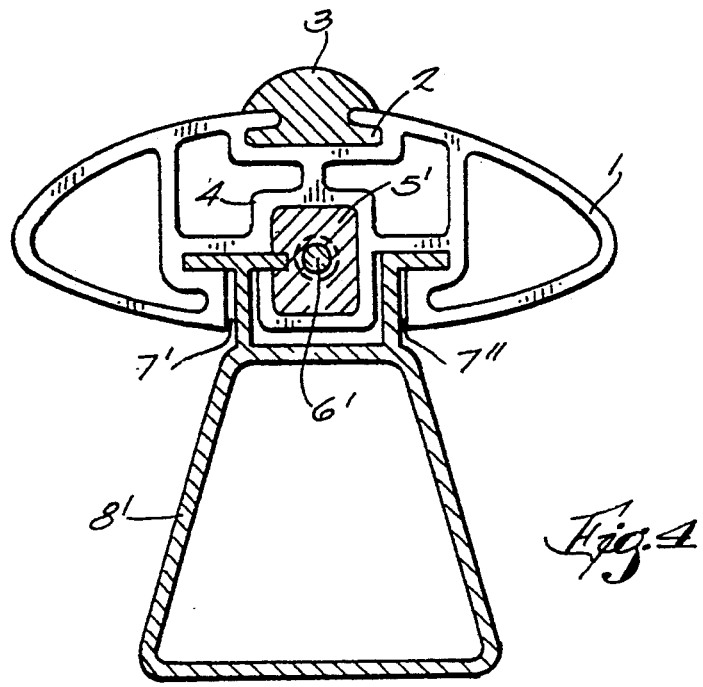
FIG. 4 illustrates a transverse section of the same bar showing the connection with one of the lateral uprights.
Figure 9:
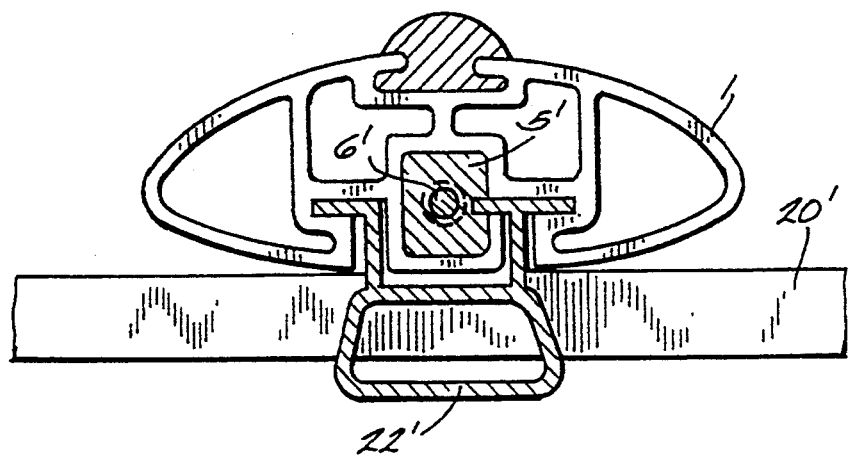
FIG. 9 is a cross-sectional view of the transverse bar showing the connecting system of the movable bracket with the adjustment nut.

The roof rack system consists essentially of a transverse bar 1 manufactured by extrusion in which its elliptical cross-section contributes both to the stiffness and streamlined configuration of the structure (FIG. 4). Internal ribs provide strength and rigidity to bar 1. The section of the bar provides three main features: a top groove 2 adapted to receive accessory mounts 3; a central opening 4 fitted to receive nuts 5 operated by a threaded shaft 6; and a double lower slot 7', 7" in which the uprights 88', 8" are connected to the nuts 5', 5".

Figure 3:
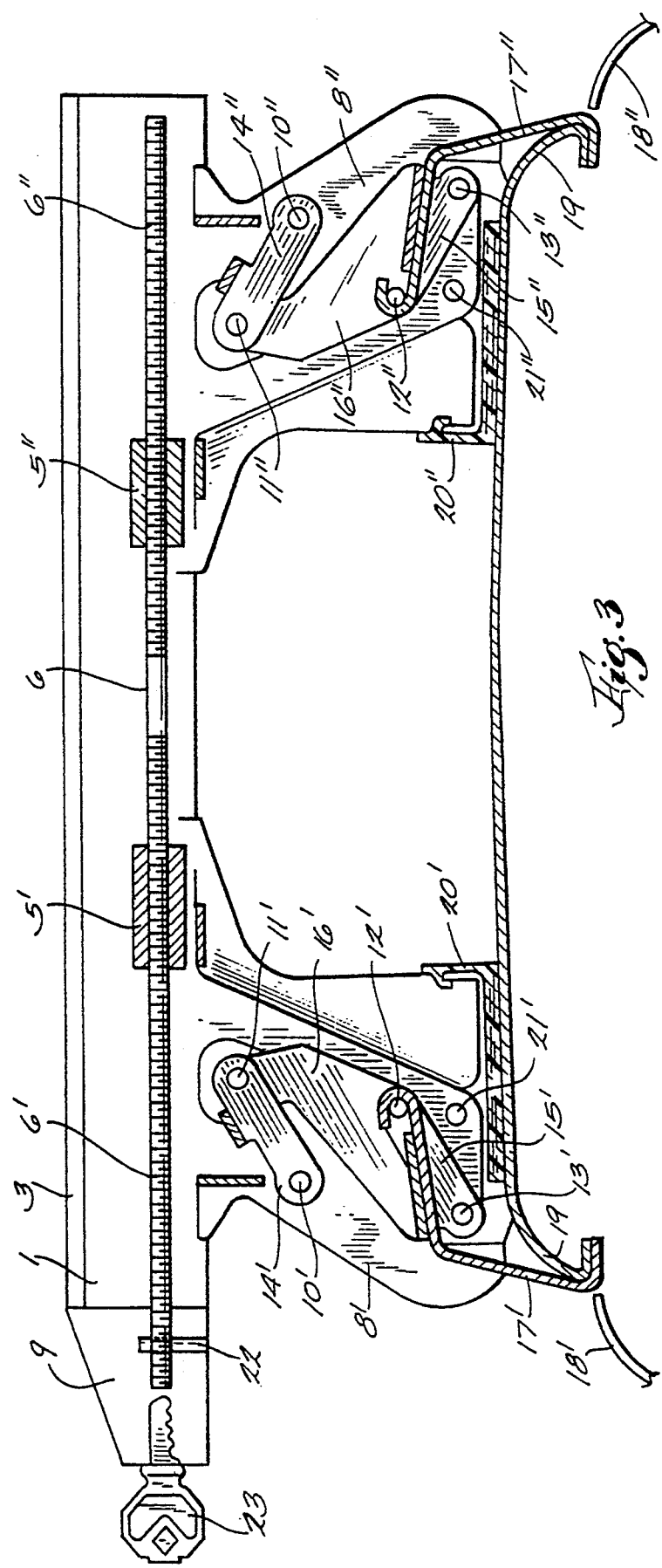
FIG. 3 illustrates a longitudinal section of the transverse bar showing inside and outside details.

As can be seen in FIG. 3, the shaft 6 has threads on each end 6', 6", respectively, with right and left threads. The threads work on respective nuts 5', 5". The uprights 8' and 8" are provided with seats that receive the above-mentioned nuts. Rotation of the shaft causes the uprights to move toward or away from each other depending on the direction of rotation.

The uprights 8', 8" are mirror images of one another. The following description of upright 8', also applies to upright 8". The upright 8' is provided with four pins 10', 11', 12', 13'. The four pins 10', 11', 12', 13' connect three arms 14', 15', 16', and the upright 8' to form a four-bar linkage. In particular, pin 10' connects upright 8' and arm 14', pin 11' connects arm 14' and arm 16', and pin 12' connects arm 16' and arm 15', and pin 13' connects arm 15' and upright 8', thereby forming a first quadrilateral. Similarly, pin 10" connects upright 8" and arm 14", pin 11" connects arm 14" and arm 16", and pin 12" connects arm 16" and arm 15", and pin 13" connects arm 15" and upright 8", thereby forming a second quadrilateral. As illustrated in FIG. 3, both the first and the second quadrilaterals are preferably parallelograms. Each arm and upright acts as a linkage. In accordance with the specific four-bar linkage design shown in FIG. 3, the three arms (i.e., 14', 15', and 16') articulate about the connecting pins, thereby allowing the four angles within the first quadrilateral to vary, and thereby forming a floating quadrilateral. The same description applies to the identical upright 8" with pins 10", 11", 12", 13" and arms 14", 15", 16". Pin 12' is also articulated to hook 17' which can be inserted into the space between the door 18' and the roof 19 of the vehicle.

The outline of the hooks 17', 17" allows the attachment to a number of vehicle types with similar outlines of the doors and roof. In order to fit the roof rack to a large number of models of contemporaneous product, it is necessary to provide a certain number of similar yet non-identical hooks, all of them however utilizing the same system of fastening.

Figure 5:
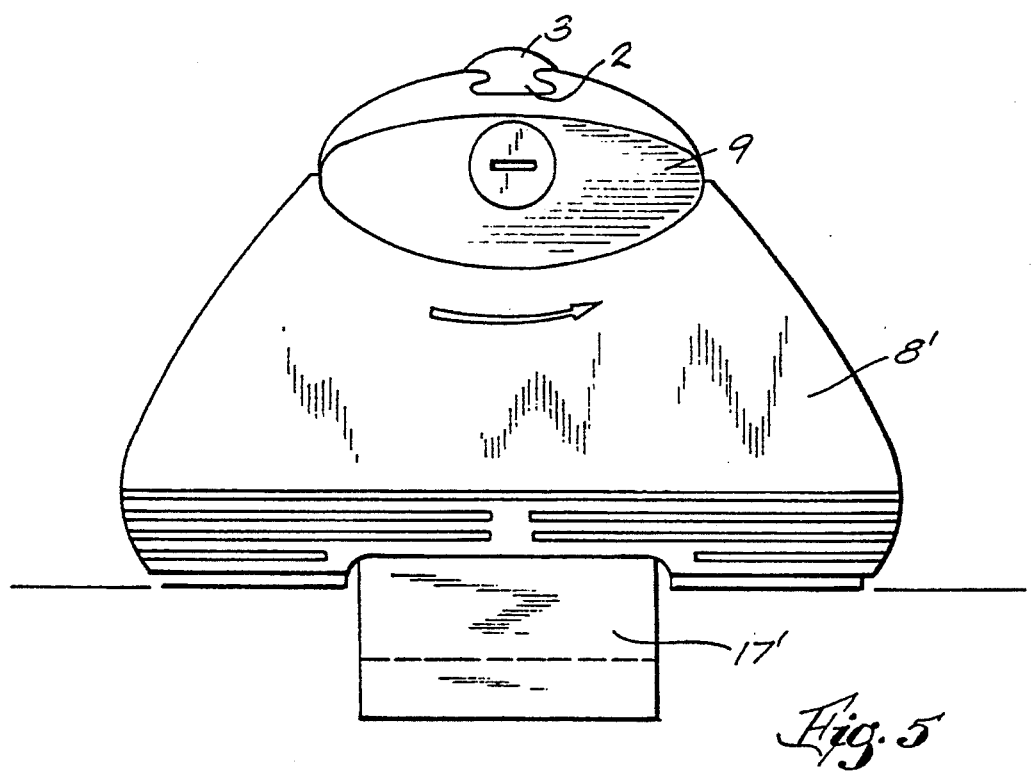
FIGS. 5 and 6 are end views showing the manually rotatable end cap in the unlocked and locked positions, respectively.
Figure 6:
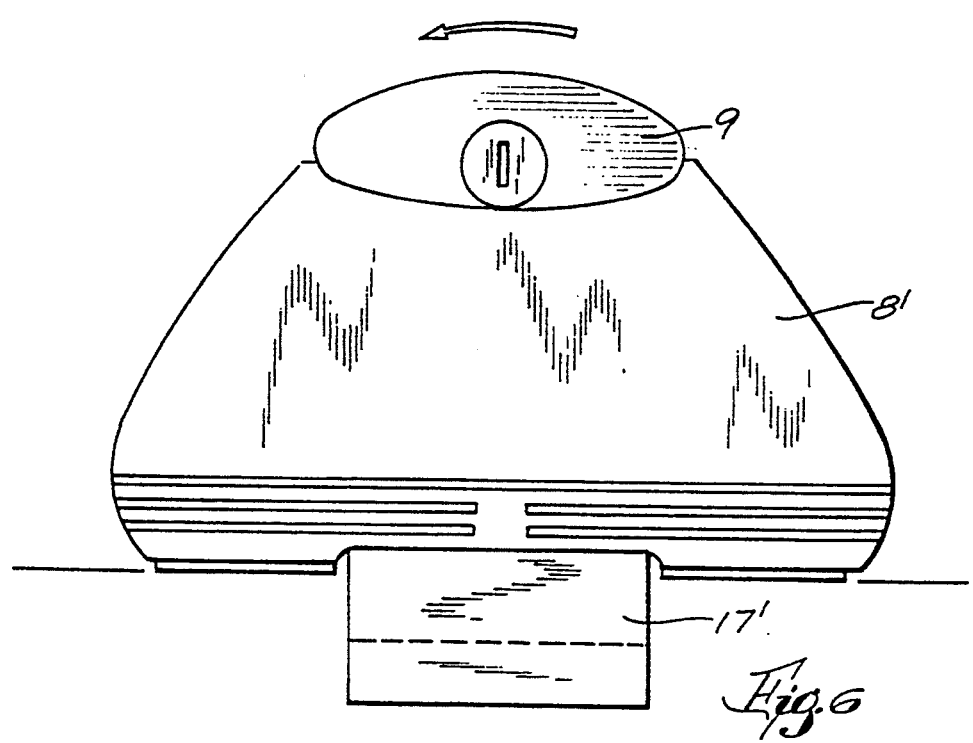
Figure 18:
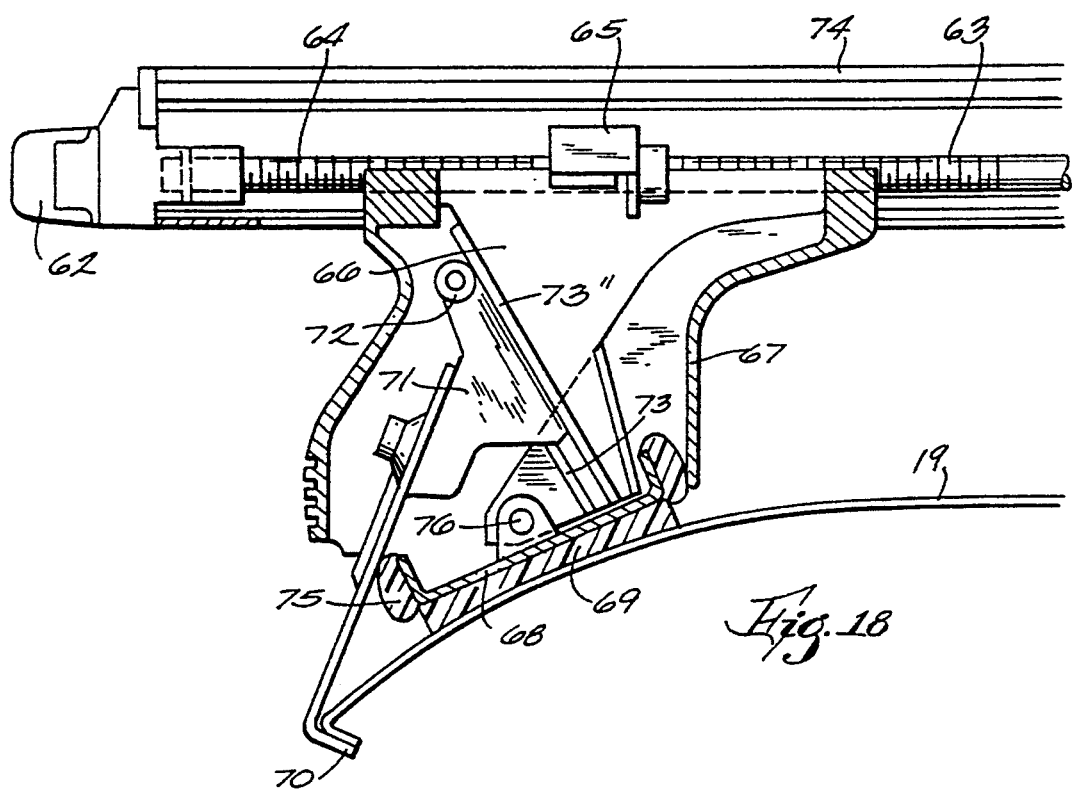
FIG. 18 is an enlarged fragmentary view of the rack shown in FIG. 17.

Also, the uprights 8', 8" are provided with cover moldings 20', 20" with the pins 21', 21", manufactured from soft material in order not to damage the paint of the roof 19. The handle 9 is attached to the shaft 6 with a pin 22 (FIG. 3), and as shown in FIGS. 5 and 6, is shaped with an elliptical asymmetric profile towards the main axis.

When handle 9 is rotated approximately 180°, its elliptical asymmetric profile allows the uncovering of upper accessory channel 2 (FIG. 5) and the insertion therein or removal of accessories 3. The groove or channel 2 is again closed by a further 180° rotation around the asymmetric rotation center constituted by the shaft 6.

Following this procedure the handle allows contemporaneously two functions, that is to say the rotation on the screw in order to fasten the roof rack to the car and the locking function to lock the accessories to the bar. Use of a lock plug with its key prevents unauthorized people from operating the handle 9. Use and fitting of the rack on the vehicle's roof is summarized by the following steps.

Figure 1:
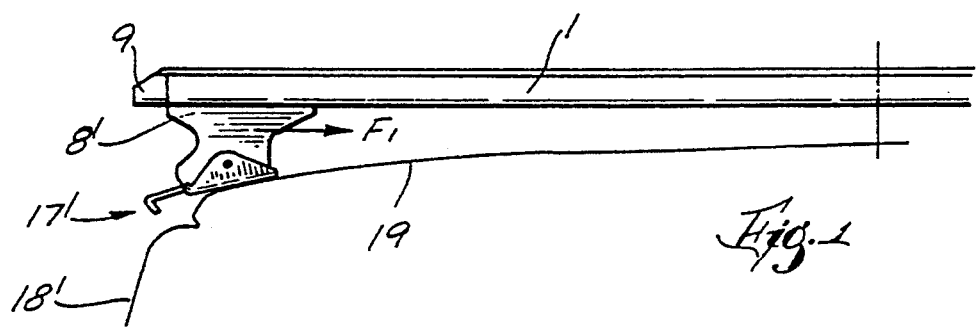
FIG. 1 depicts a lateral view of the roof rack simply resting on the roof of the vehicle.
Figure 2:
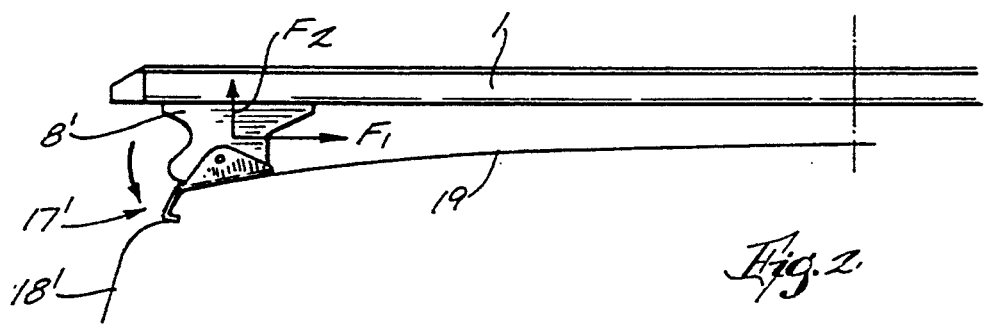
FIG. 2 illustrates the same roof rack fastened to the roof.

The user, by turning handle 9, (FIG. 1) first spreads the uprights 8', 8" to their maximum spacing then with inverse rotation of handle 9 causes the simultaneous and symmetric movement toward each other of the uprights 8', 8" until the hooks 17', 17" engage the slots between the door 18', 18" and the roof 19 As the hooks 18', 18" engage the slots. As the hooks 17', 17" engage the slots, the hooks 17", 17" act as levers on the two four-bar linkages. In particular, when hook 17' engages the roof 19, the force F1 is transmitted by the hook 17' to the arm 15' which acts as the input link or driver. This force is transmitted to arm 14', which acts as the output link or follower, via arm 16' which acts as a coupler. As a result, the floating quadrilateral formed by arms 14', 15', 16' and upright 8' are tilted, and the horizontal motion caused by force F1 is converted to vertical motion, and the roof rack is pulled toward the roof of the vehicle, thereby locking the transverse bar 1. In this manner the roof rack is assembled and fastened, centered exactly with the single operation of the handle 9.

Figure 7:
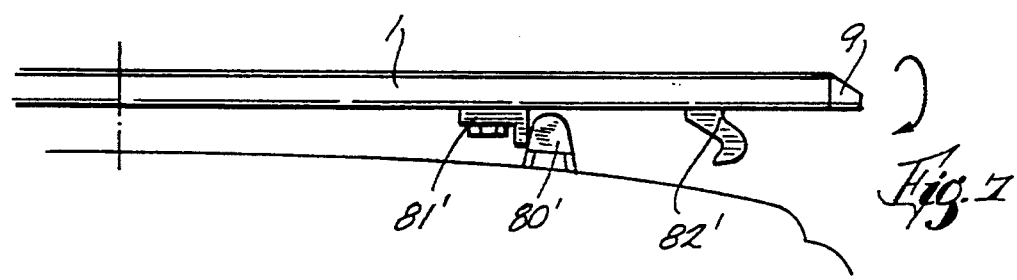
FIGS. 7 and 8 are side views of an alternative embodiment of the present invention designed for installation of the rack on a vehicle having pre-fixed roof supports.
Figure 8:
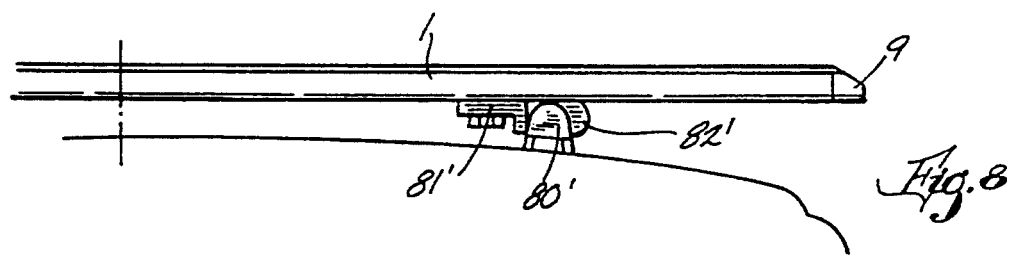

A variant of the above system is represented by the assembling of the rack on vehicles having fixed guides pre-assembled on the roof. This embodiment of the present invention is illustrated in FIGS. 7 and 8, wherein half of the roof rack is shown. Those skilled in the art will recognize that the unshown opposite end of the rack is the mirror image of the end that is illustrated. In accordance with this embodiment, the transverse bar 1 is not provided with uprights which are not then needed but rather is connected directly on the fixed guides 80'. The centering of the transverse bar 1 and the locking on the fixed guides 80' is allowed by two fixed brackets 81', that are bolted to the transverse bar 1 in a symmetric position and at a distance equal to the inner distance between the above-mentioned guides 80' and two movable hooks 82, connected to nut 5, 5" and using the previously described channel system.

By turning the handle 9 (FIG. 7) the hooks 82' approach each other symmetrically until they engage the fixed brackets 80' thus locking the transverse bar 1.

A further embodiment of the invention is shown in FIGS. 10–15. In this embodiment an elliptically cross-sectioned transverse bar 30 is provided with an upwardly facing opening 31. Opening 31 as seen in FIG. 14 is adapted to receive hardware components 29 for receiving therein sporting goods 28 or other items to be transported. These components include various clamps, bolts and other attachment devices as are already known in the art.

Threaded rod 32 is provided with left-hand threads on one end and right-hand threads on the opposite end so that nuts 34 and 36 threaded thereon will move in opposite directions as knob 33 affixed to the end of threaded rod 32 is rotated. Nuts 34 and 36 are fitted into notches 38 and 39 of triangularly-shaped end supports 40 and 41, respectively. Support bodies 42 and 43 are slidably attached to the upwardly and outwardly inclined surfaces of end supports 40 and 41, respectively. Support bodies 42 and 43 carry angularly adjustable, hook members 44 and 45, respectively. Hooks 44 and 45 are adapted to engage roof gutters 19A in order to clamp the support in place on vehicle roof 19.

As best seen in FIGS. 11 and 13, support member 40 is provided with flange 46. Support body 42 is similarly provided with inwardly extending flange 48. As seen in FIG. 13, inner fitting flange 48 provides a track upon which member 42 slidably engages member 40. Components 41 and 43 are provided with a similar track arrangement. Foot members 49 are pivotally attached to the bottom of end supports 40 and 41 so that the rack can be placed on vehicle roofs of various configurations. Foot members 49 are preferably provided with a cushioning rubber layer 50 so as to avoid marring of the surface of vehicle roof 19. It will be noted that when nuts 34 and 36 are moved toward each other starting, for example, from the position shown by phantom lines in FIG. 10, that after hooks 44 and 45 engage opposite gutters 19A and nuts 34 and 36 continue to move toward the center of the vehicle, that members 42 and 43 will be forced to move upwardly and outwardly by sliding up the inclined surfaces of supports 40 and 41. This will cause the hooks 44 and 45 to engage the gutters with a generally upward motion causing the ends of the hooks to engage gutters 19A firmly. This motion causes the rack to be better attached to the vehicle than if the tops of the hooks were to pivot toward the center of the vehicle.

An alternate form of locking knob mechanism 33 is seen in FIGS. 10 and 15. In this modification the bottom 51 of knob 33 can be provided with a notch or channel 54 so that when the bottom 51 is rotated to the top position the end of channel 31 will be exposed to allow insertion or removal of supporting members 29. When the knob 33 is once again rotated so that notch 54 51 faces downwardly, the knob 33 can be locked by means of key 52 thereby locking the ends of channels 31 in the closed position and preventing removal therefrom of the sporting goods supports 29. Note in FIGS. 12 and 13 that nut 34 is slidable in a channel formed by the underside of channel 31 and internal rib components of transverse bar 30. Note that outwardly extending flanges 53 on the top of members 40 and 41 also provide means for slidably supporting the members relative to transverse bar 30 within channels formed in the internal ribbing.

FIGS. 16-19 show a further modification of the embodiment of FIGS. 10-15. Turning the knob 62 causes the central rod 63, which has an opposite thread at its ends 64, 64' to rotate. The bodies of the supports 66, 66' bear the nuts 65, 65' in a notch. The rotation of the knob 62 of the rod 63 therefore causes the supports 66, 66' to move towards each other with a self-centering action. The said supports consist of a series of parts enclosed in a casing 67, 67' made from thermoplastic or similar material which acts as a protective cover. The bottom of the plate 68, 68', rocking on its own pin 76 in relation to the support, rests on the roof 19 of the vehicle. Appropriate plastic bearings 69, 69' and 75, 75' allow a flexible support on the roof as well as sliding on it for the self-centering action, the casin 67, 67' providing a dust seal. As the knob 62 is turned by the user, the supports 66, 66' with the nut screws 65, 65' approach the center of the roof rack and the hooks 70, 70' lift up and hook onto the edge of the body. The supports' horizontal movement towards the center corresponds to the mechanical movement of the hook system and the upward traction in the supports themselves. The hooks 70, 70' are fixed to the molded and shaped bodies 71, 71' which carry a prismatic guide system 73, 73' and a roller 72, 72'.

The assembly allows the bodies 71, 71' to slide with the brackets in relation to the central body 66, 66'. The approximately 30° angle of the prismatic guides of the supports 71, 71' determines both dynamic action and the movement of the hooks 70, 70' which lift up and generate traction force on the hook as the support moves towards the center.

The roller 72 that follows the movement of the body 71 and the bracket 70 is in its lowered position when the hook is free and in its raised position when the hook 70 is tensioned with the roof rack fitted and fixed to the vehicle.

Figure 19:
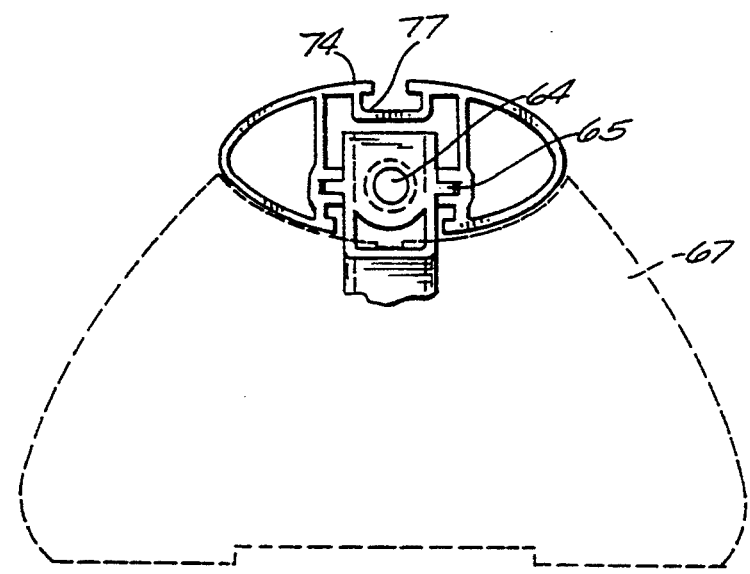
FIG. 19 is an end view of the rack of FIG. 18 with internal parts.

The detail in FIG. 19 offers a sectional view of the elliptical shape of the cross-member 74 with the upper channel 77 for fitting the accessories. The structure is ribbed to ensure maximum strength and rigidity. Located in a channel in the outer section of one end is the nut screw 65 or 65' which, operated by the threaded part 64 or 64' of the central rod, which is in turn operated by the knob 62 (FIG. 18), causes the whole support to move towards the center of the roof 19.

The invention herein depicted and illustrated by the foregoing example may be varied without departing from the spirit of the invention.

What is claimed is:

1. A carrier for a roof of a motor vehicle comprising:
a cross bar;
a threaded rod having two oppositely wound threaded segments and rotatably mounted within said cross bar;
an end member attached to an end of said threaded rod and being rotatable therewith;
said cross bar having a channel which extends to an end of said cross bar, said channel being adapted to receive article constraining members therein;
said end of said cross bar including a surface that is substantially adjacent to and parallel to a surface of said end member, said end member being provided with a portion that closes said channel at said end of said cross bar, and another portion that opens said channel at said end of said cross bar by rotation of said end member.

2. A carrier according to claim 1 further comprising:
a support leg adjacent each end of said cross bar and positioned within and movable linearly along a track formed within said cross bar;
each of said threaded segments of said threaded rod being threaded onto a nut member that communicates with one of said support legs, whereby rotation of said end member in one direction causes said support legs to move toward each other and rotation in the opposite direction causes said support legs to move away from each other.

3. A carrier according to claim 2 further comprising a roof engaging member attached to said support leg.

4. A carrier according to claim 3 wherein said roof engaging member is slidably attached to said support leg.

5. A carrier according to claim 3 that is adapted for securing to a roof having fixed guides preassembled thereon, wherein said roof engaging member is integral with said support leg, said carrier further comprising two brackets mounted within said cross-bar such that when said end member is rotated, said support legs move toward each other until said fixed guides are sandwiched between said roof engaging members and said brackets.

6. A carrier for the roof of a motor vehicle comprising:
a cross bar;
a support leg extending from said cross bar and movable in a direction parallel to said cross bar;
a roof engaging member attached to said support leg such that said roof engaging member is freely movable relative to said support leg along a selected direction that is angled relative to said cross bar, whereby as said support leg is moved inwardly, said roof engaging member engages said roof, and said support leg is pulled downwardly as said roof engaging member moves relative to said support leg along said selected direction.

7. A carrier according to claim 6 further comprising:
a threaded rod having two oppositely wound threaded segments and positioned within said cross bar and rotatably mounted therein.

8. A carrier according to claim 7 further comprising:
an end member attached to an end of said threaded rod and being rotatable therewith;
said cross bar having a channel which extends to an end of said cross bar, said channel being adapted to receive article constraining members therein;
said end of said cross bar including a surface that is substantially adjacent to and parallel to a surface of said end member, said end member being provided with a portion that closes said channel at said end of said cross bar, and another portion that opens said channel at said end of said cross bar by rotation of said end member.

9. A carrier according to claim 7 including two of said support legs wherein each of said threaded segments is threaded onto a nut member that communicates with one of said support legs, whereby rotation of said rod in one direction causes said support legs to move toward each other and rotation in the opposite direction causes said support legs to move away from each other.

10. The carrier of claim 6, wherein said support leg includes a first inclined surface having a first flange extending therefrom, and said roof engaging member includes a second inclined surface having a second flange extending therefrom, wherein said first flange and said second flange are interconnected, thereby forming a track aligned with said selected direction upon which said roof engaging member movably engages said support leg.

11. A carrier according to claim 10, further comprising a threaded rod having two oppositely wound threaded segments and positioned within said cross bar and rotatably mounted therein.

12. A carrier according to claim 11 further comprising:
an end member attached to an end of said threaded rod and being rotatable therewith;
said cross bar having a channel which extends to an end of said cross bar, said channel being adapted to receive article constraining members therein;
said end of said cross bar including a surface that is substantially adjacent to and parallel to a surface of said end member, said end member being provided with a portion that closes said channel at said end of said cross bar, and another portion that opens said channel at said end of said cross bar by rotation of said end member.

13. A carrier according to claim 11 including two of said support legs, wherein each of said threaded segments is threaded onto a nut member that is coupled with one of said support legs, whereby rotation of said rod in one direction causes said support legs to move toward each other and rotation in the opposite direction cause said support legs to move away from each other.

14. A carrier for a roof of a motor vehicle comprising:
a cross bar;
a support leg extending from said cross bar and movable in a direction parallel to said cross bar;
a roof engaging member attached to said support leg by floating quadrilaterals, such that as said roof engaging member is moved inward and engages said roof, said cross bar and said support leg are pulled downward.

15. A carrier according to claim 14 further comprising:
a threaded rod having two oppositely wound threaded segments and positioned within said cross bar and rotatably mounted therein.

16. A carrier according to claim 15 further comprising:
an end member integrally attached to an end of said threaded rod and being rotatable therewith;
said cross bar having a channel which extends to an end of said cross bar, said channel being adapted to receive article constraining members therein;
said end of said cross bar including a surface that is substantially adjacent to and parallel to a surface of said end member, said end member being provided with a portion that closes said channel at said end of said cross bar, and another portion that opens said channel at said end of said cross bar by rotation of said end member.

17. A carrier according to claim 15 including two of said support legs wherein each of said threaded segments of said threaded rod are threaded onto a nut member that communicates with one of said support legs, whereby rotation of said rod in one direction causes said support legs to move toward each other and rotation in the opposite direction causes said support legs to move away from each other.

18. A carrier for a roof of a motor vehicle comprising:
a cross bar;
a support leg extending from said cross bar and movable in a direction parallel to said cross bar;
roof engaging member attached to said support leg;
a four-bar linkage associated with said support leg and said roof engaging member such that when said roof engaging member engages said roof, said cross bar and said support leg are pulled downward.

19. A carrier according to claim 18 wherein the four-bar linkage comprises a quadrilateral formed by a first arm, a second arm, a third arm, and said support leg interconnected by four pins.

20. A carrier according to claim 19 wherein said first arm acts as an input link, and said roof engaging member is associated with said first arm such that as said roof engaging member engages said roof, said roof engaging member acts as a lever on said first arm.

* * * * *

UNITED STATES PATENT AND TRADEMARK OFFICE
CERTIFICATE OF CORRECTION

PATENT NO. : 5,397,042
DATED : March 14, 1995
INVENTOR(S) : Fabio Pedrini

It is certified that error appears in the above-indentified patent and that said Letters Patent is hereby corrected as shown below:

Column 8,

In claim 13, line 2, delete "cause" and substitute --causes--.

Signed and Sealed this

Twenty-seventh Day of February, 1996

Attest:

BRUCE LEHMAN

*Attesting Officer*     *Commissioner of Patents and Trademarks*